(12) United States Patent
Gopi et al.

(10) Patent No.: US 7,720,505 B2
(45) Date of Patent: May 18, 2010

(54) PERSONAL LIFESTYLE DEVICE

(75) Inventors: Paramesh Gopi, Cupertino, CA (US);
Aswath Mohan, San Jose, CA (US);
Partho Mishra, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 1076 days.

(21) Appl. No.: 11/369,454

(22) Filed: Mar. 7, 2006

(65) Prior Publication Data

US 2007/0214492 A1 Sep. 13, 2007

(51) Int. Cl.
*H04M 1/00* (2006.01)
(52) U.S. Cl. .................. 455/552.1; 455/425; 455/432.3; 455/556.1; 705/26; 709/203; 709/217; 726/2; 726/3
(58) Field of Classification Search .................. 455/411, 455/425, 432.3, 552.1, 556.1; 705/26; 709/203, 709/217, 219; 726/2, 3, 16, 17
See application file for complete search history.

(56) References Cited

U.S. PATENT DOCUMENTS

| | | | |
|---|---|---|---|
| 6,272,120 | B1 | 8/2001 | Alexander |
| 6,600,726 | B1 | 7/2003 | Nevo et al. |
| 6,795,701 | B1 | 9/2004 | Baker et al. |
| 6,932,698 | B2 | 8/2005 | Sprogis |
| 7,072,323 | B2 | 7/2006 | Roberts et al. |
| 7,097,562 | B2 | 8/2006 | Gagner |
| 7,181,544 | B2 | 2/2007 | Vangal et al. |
| 7,224,964 | B2 | 5/2007 | Souissi et al. |
| 7,236,772 | B1 | 6/2007 | Botzas |
| 7,251,235 | B2 | 7/2007 | Wentink |

(Continued)

FOREIGN PATENT DOCUMENTS

WO    WO 02/37232    5/2002

(Continued)

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

(Continued)

*Primary Examiner*—Nay A Maung
*Assistant Examiner*—Tuan H Nguyen

(57) ABSTRACT

A personal lifestyle device (PLD) includes a communication module, a memory device, and a control module. The communication module communicates with a wireless network. The memory device stores authentication information that authorizes communication between the PLD and at least one of the wireless network and a lifestyle service provider, and a profile comprising a lifestyle service ordered from the lifestyle service provider using the PLD. The control module communicates with the communication module and the memory device, automatically establishes communication between the PLD and at least one of the wireless network and the lifestyle service provider using the authentication information, automatically receives a unicast for the lifestyle service from the lifestyle service provider, wherein the unicast is selectively based on the profile, and selectively transmits an order for the lifestyle service to the lifestyle service provider.

25 Claims, 5 Drawing Sheets

U.S. PATENT DOCUMENTS

2002/0174025 A1* 11/2002 Hind et al. .................... 705/26
2005/0137981 A1    6/2005 Maes
2005/0250440 A1* 11/2005 Zhou et al. ................. 455/12.1
2007/0049296 A1*  3/2007 Gupta et al. ............. 455/456.5

FOREIGN PATENT DOCUMENTS

WO    WO 2004/068766    8/2004

OTHER PUBLICATIONS

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless Lan Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11g/D2.8, May 2002 (Supplement to ANSI/IEEE Std 802.11, 1999 Edition) DRAFT Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band; LAN/MAN Standards Committee of the IEEE Computer Society; 53 pages.

IEEE Std 802.11h—2003 (Amendment to IEEE Std 802.11, 1999 Edition (Reaff 2003)); as amended by IEEE Stds 802.11a-1999, 802.11b-1999, 802.11b-1999/Cor 1-2001, 802.11d-2001, and 802.11 g-2003; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 75 pages.

802.11n; IEEE P802.11-04/0889r6; Wireless LANs, TGn Sync Proposal Technical Specification; 131 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE 802.20-PD-06, IEEE p. 802.20 V 14, Jul. 16, 2004, Draft 802.20 Permanent Document, System Requirements for IEEE 802.20 Mobile Broadband Wireless Access Systems—Version 14, 24 pages.

PCT Notification of Transmittal of the International Search Report and the Written Opinion of the International Searching Authority dated Jul. 26, 2007 for Application No. PCT/US2007/005620; 11 pages.

* cited by examiner

PERSONAL LIFESTYLE DEVICE

FIELD OF THE INVENTION

The present invention relates to wireless networks.

BACKGROUND OF THE INVENTION

Communication technology has had a significant impact on the lifestyles of consumers. For example, satellite systems have enhanced the quality and coverage of cellular phone systems. Satellites have also revolutionized television/radio broadcasting by providing alternatives to terrestrial-based broadcasting. Improved multimedia technology has enabled video conferencing over the Internet, which has reduced the cost of doing business.

Communication systems are increasingly becoming interactive. Movies on television can be ordered on demand. Goods can be ordered while viewing advertisements for the goods on television and on the Internet. Suppliers selling products on the Internet can track orders placed by consumers and advertise related products to those consumers. Additionally, consumers can specify their preferences and receive information selectively from the suppliers. Consumers, however, need to log on to the Internet to view the information and benefit from it.

SUMMARY OF THE INVENTION

A personal lifestyle device (PLD) comprises a communication module that communicates with a wireless network, a memory device that stores authentication information that authorizes communication between the PLD and at least one of the wireless network and a lifestyle service provider, and a profile comprising a lifestyle service ordered from the lifestyle service provider using the PLD, and a control module that communicates with the communication module and the memory device, automatically establishes communication between the PLD and at least one of the wireless network and the lifestyle service provider using the authentication information, automatically receives a unicast for the lifestyle service from the lifestyle service provider, wherein the unicast is selectively based on the profile, and selectively transmits an order for the lifestyle service to the lifestyle service provider.

In another feature, the communication module communicates with a plurality of wireless networks and a plurality of lifestyle service providers.

In another feature, the PLD further comprises a display module that communicates with the control module and displays the unicast.

In another feature, the PLD further comprises an audio module, including a speaker and a microphone, that communicates with the control module, wherein the speaker generates audible sound waves based on data received by the PLD from at least one of the wireless network and the lifestyle service provider, and the microphone generates data transmitted by the PLD to at least one of the wireless network and the lifestyle service provider based on sound waves received by the microphone.

In another feature, the PLD further comprises a keypad module that communicates with the control module and is used to input information into the PLD.

In another feature, the PLD further comprises a search engine that communicates with the control module and searches lifestyle services offered by lifestyle service providers based on the profile.

In another feature, the PLD further comprises a sensing module that communicates with the control module and senses data comprising at least one of an ambient temperature, a body temperature of a user, and a heart-rate of a user. The order is selectively based on one of an ambient temperature, a body temperature of a user, a heart-rate of a user stored in the memory device.

In another feature, the PLD further comprises an interface module, including a plurality of communication interfaces, that communicates with the control module and communicates with a non-wireless device having one of the communication interfaces. The non-wireless device communicates with the wireless network via the PLD.

In another feature, the communication module communicates peer-to-peer with devices on wireless networks.

In another feature, the PLD further comprises a display module that communicates with the control module and automatically displays a list of persons that are online on the wireless network. The communication module communicates with the persons using one of voice and instant messaging.

In another feature, the PLD further comprises a biometrics module that communicates with the control module and stores biometric data of a user. The communication module communicates with radio frequency identification systems based on the biometric data.

In still other features, a method for managing personal lifestyle comprises communicating with a wireless network, storing authentication information that authorizes communication with the wireless network and a lifestyle service provider, storing a profile comprising a lifestyle service ordered from the lifestyle service provider in the communication, and automatically communicating the authentication information with at least one of the wireless network and the lifestyle service provider, automatically receiving a unicast for the lifestyle service from the lifestyle service provider, wherein the unicast is selectively based on the profile, and selectively transmitting an order for the lifestyle service to the lifestyle service provider.

In another feature, the method further comprises communicating with a plurality of wireless networks and a plurality of lifestyle service providers.

In another feature, the method further comprises displaying the unicast.

In another feature, the method further comprises generating audible sound waves based on data received from at least one of the wireless network and the lifestyle service provider, and generating data transmitted to at least one of the wireless network and the lifestyle service provider based on sound waves.

In another feature, the method further comprises searching lifestyle services offered by lifestyle service providers based on the profile.

In another feature, the method further comprises sensing data comprising at least one of an ambient temperature, a body temperature of a user, and a heart-rate of a user. The order is selectively based on one of an ambient temperature, a body temperature of a user, a heart-rate of a user stored in the memory device.

In another feature, the method further comprises communicating with a non-wireless device.

In another feature, the method further comprises communicating peer-to-peer with devices on wireless networks.

In another feature, the method further comprises automatically displaying a list of persons that are online on the wireless network and communicating with the persons using one of voice and instant messaging.

In another feature, the method further comprises storing biometric data of a user and communicating with radio frequency identification systems based on the biometric data.

In still other features, a personal lifestyle device (PLD) comprises communication means for communicating with a wireless network, memory means for storing authentication information that authorizes communication between the PLD and at least one of the wireless network and a lifestyle service provider, and a profile comprising a lifestyle service ordered from the lifestyle service provider using the PLD, and control means for communicating with the communication means and the memory means, automatically establishing communication between the PLD and at least one of the wireless network and the lifestyle service provider using the authentication information, automatically receiving a unicast for the lifestyle service from the lifestyle service provider, wherein the unicast is selectively based on the profile, and selectively transmitting an order for the lifestyle service to the lifestyle service provider.

In another feature, the communication means communicates with a plurality of wireless networks and a plurality of lifestyle service providers.

In another feature, the PLD further comprises display means for communicating with the control means and displaying the unicast.

In another feature, the PLD further comprises audio means, including speaker means and microphone means, for communicating with the control means, wherein the speaker means generates audible sound waves based on data received by the PLD from at least one of the wireless network and the lifestyle service provider, and the microphone means generates data transmitted by the PLD to at least one of the wireless network and the lifestyle service provider based on sound waves received by the microphone.

In another feature, the PLD further comprises keypad means for communicating with the control means and inputting information into the PLD.

In another feature, the PLD further comprises search engine means for communicating with the control means and searching lifestyle services offered by lifestyle service providers based on the profile.

In another feature, the PLD further comprises sensing means for communicating with the control means and sensing data comprising at least one of an ambient temperature, a body temperature of a user, and a heart-rate of a user. The order is selectively based on one of an ambient temperature, a body temperature of a user, a heart-rate of a user stored in the memory device.

In another feature, the PLD further comprises interface means for communicating with the control means and communicating with a non-wireless device having the interface means. The non-wireless device communicates with the wireless network via the PLD.

In another feature, the communication means communicates peer-to-peer with devices on wireless networks.

In another feature, the PLD further comprises display means for communicating with the control means and automatically displaying a list of persons that are online on the wireless network. The communication means communicates with the persons using one of voice and instant messaging.

In another feature, the PLD further comprises biometrics means for communicating with the control means and storing biometric data of a user. The communication means communicates with radio frequency identification systems based on the biometric data.

In still other features, a computer method for managing personal lifestyle comprises communicating with a wireless network, storing authentication information that authorizes communication with the wireless network and a lifestyle service provider, storing a profile comprising a lifestyle service ordered from the lifestyle service provider in the communication, automatically communicating the authentication information with at least one of the wireless network and the lifestyle service provider, automatically receiving a unicast for the lifestyle service from the lifestyle service provider, wherein the unicast Is selectively based on the profile, and selectively transmitting an order for the lifestyle service to the lifestyle service provider.

In another feature, the computer method further comprises communicating with a plurality of wireless networks and a plurality of lifestyle service providers.

In another feature, the computer method further comprising displaying the unicast.

In another feature, the computer method further comprises generating audible sound waves based on data received from at least one of the wireless network and the lifestyle service provider, and generating data transmitted to at least one of the wireless network and the lifestyle service provider based on sound waves.

In another feature, the computer method further comprises searching lifestyle services offered by lifestyle service providers based on the profile.

In another feature, the computer method further comprises sensing data comprising at least one of an ambient temperature, a body temperature of a user, and a heart-rate of a user. The order is selectively based on one of an ambient temperature, a body temperature of a user, a heart-rate of a user stored in the memory device.

In another feature, the computer method further comprises communicating with a non-wireless device.

In another feature, the computer method further comprises communicating peer-to-peer with devices on wireless networks.

In another feature, the computer method further comprises automatically displaying a list of persons that are online on the wireless network and communicating with the persons using one of voice and instant messaging.

In another feature, the computer method further comprises storing biometric data of a user and communicating with radio frequency identification systems based on the biometric data.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
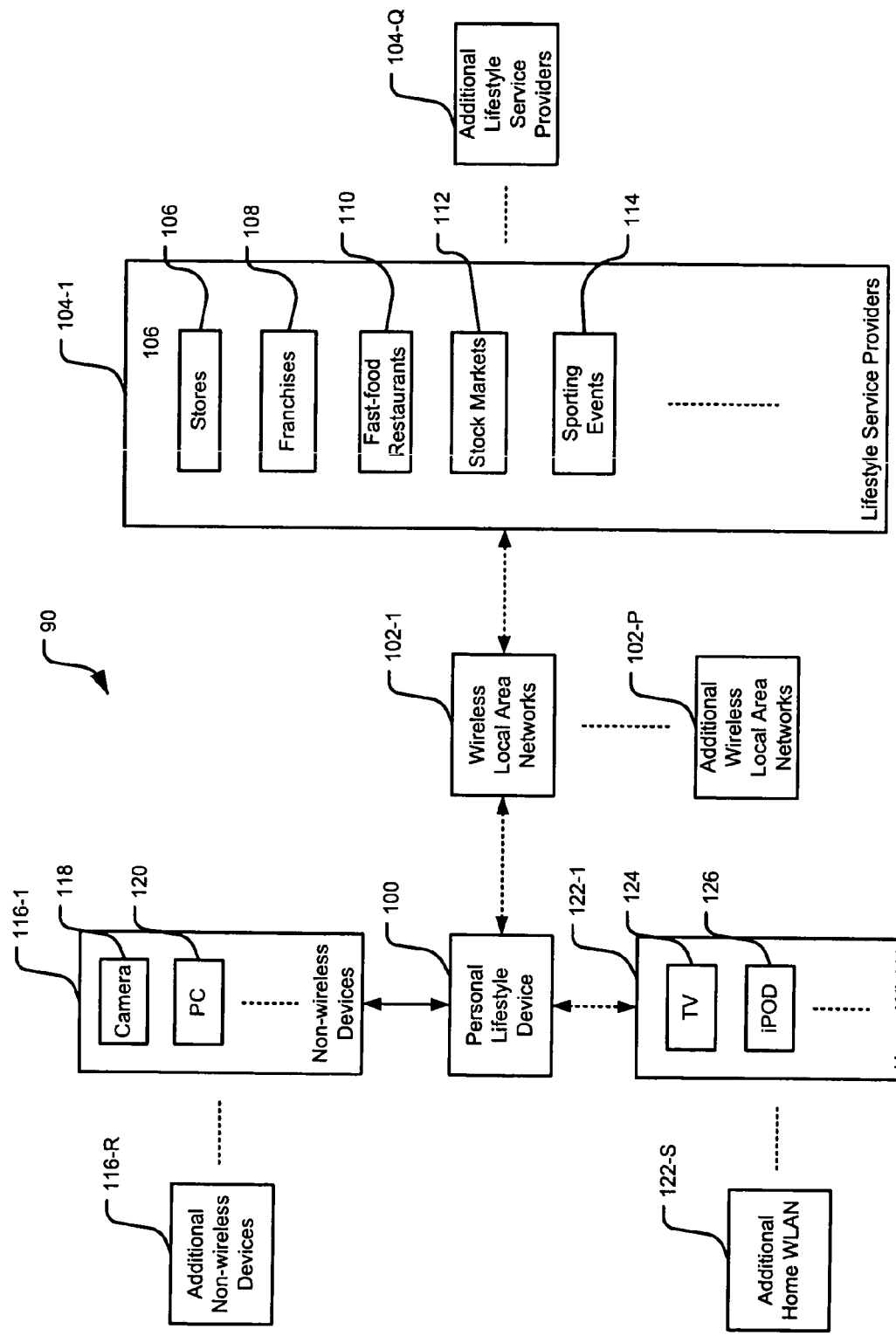
FIG. 1 shows is a functional block diagram of a personal lifestyle device operating in an exemplary environment according to the present invention.

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

Referring now to FIG. 1, a personal lifestyle device 100 is shown in an exemplary environment 90. The device 100 can securely communicate with one or more wireless local area networks 102-1, ..., 102-P (collectively 102). The networks 102 may be administered by one or more network providers. The device 100 can communicate with one or more lifestyle service providers 104-1, ..., 104-Q (collectively 104) using the networks 102. The lifestyle service providers 104 may include stores 106, franchises 108, food/beverage service provides such as fast-food restaurants 110, etc. The device 100 can be used to order services such as apparel, food, beverages, etc. from the lifestyle service providers 104.

Conversely, the lifestyle service providers 104 can advertise context-specific information about their lifestyle services on the device 100. The lifestyle service providers 104 can accomplish this by using logs of past behavior of a user such as buying patterns of the user that may be stored in the device 100 in the form of user profiles or user behavior logs.

Additionally, the device 100 can monitor events such as stock prices in stock markets 112, scores of sporting events 114, etc. The monitored stock prices, sporting teams, etc., also may be based on user profiles and/or the logs. Other utilities of the device 100 may include enabling devices 116-1, ..., 116-R (collectively 116) that do not have wireless communication capabilities to communicate with wireless networks 102. That is, the device 100 can be used as a bridge between the wireless networks 102 and the devices 116 that are not equipped with wireless interfaces.

Furthermore, the device 100 can be used as a remote control to control TCP/IP enabled devices in a home-based wireless LAN (WLAN) 122-1, ..., 122-S (collectively 122). Such devices may include a TV 124, an iPOD 126, etc. The device 100 can also be used to communicate directly with other devices in peer-to-peer mode independent of location. For example, the device 100 can be used to chat using voice and instant messenger (IM).

Additionally, the device 100 can be used to monitor vital statistics of the user. The statistics may include temperature, heart-rate, etc. The device 100 can also be used to store biometric data of the user. The biometric data may include fingerprints, eye-scans, etc. The biometric data can be used for identification/authentication purposes. Thus, the device 100 can be used as an active tag in radio frequency identification (RFID) applications. As can be appreciated, the device 100 is a versatile, scalable, and multifunction device that can be used in many different applications.

Figure 2:
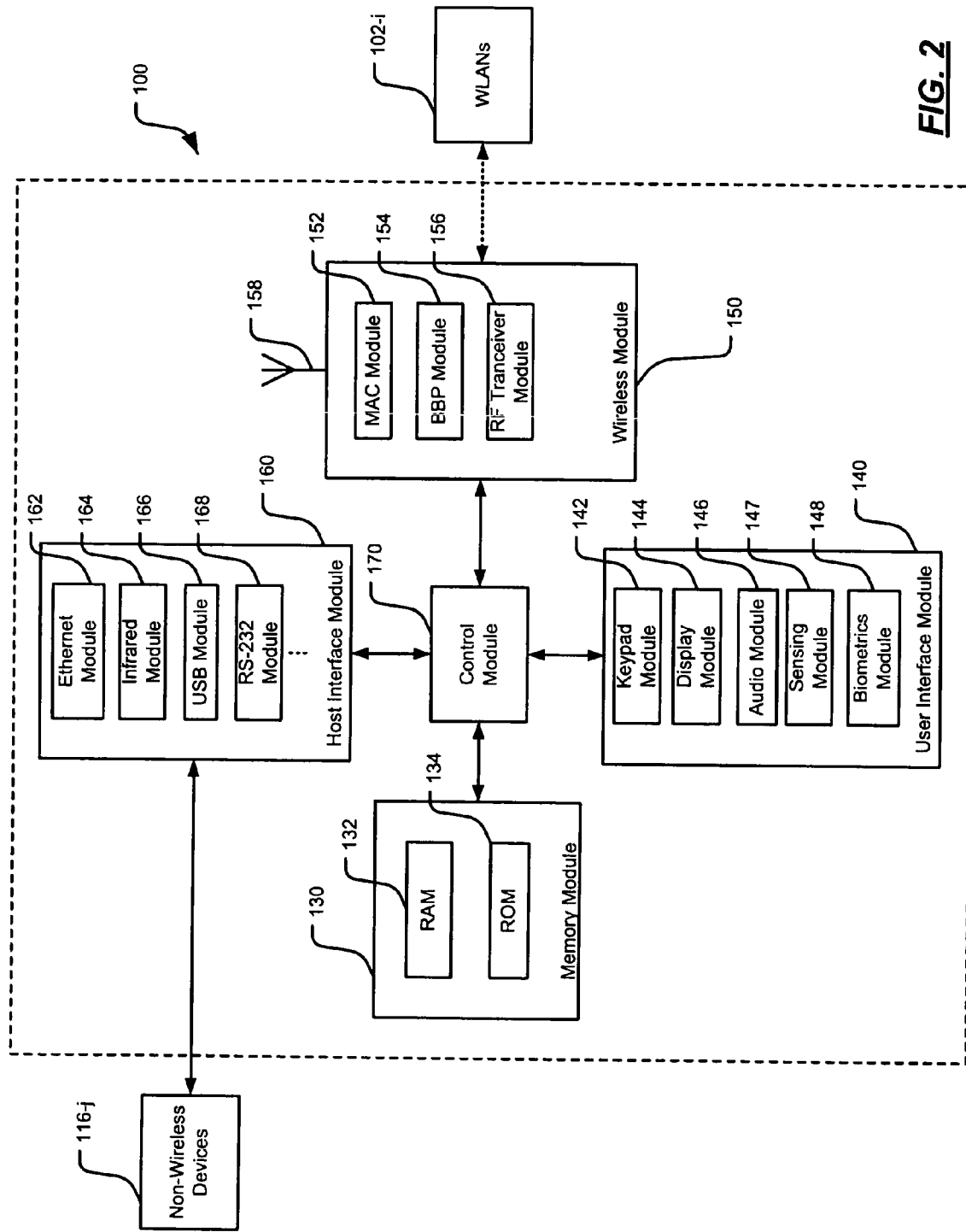
FIG. 2 is an exemplary functional block diagram of a personal lifestyle device according to the present invention.

Referring now to FIG. 2, a hardware configuration of a wireless personal lifestyle device 100 is shown. The device 100 comprises a memory module 130, a user interface module 140, a wireless module 150, a host interface module 160, and a control module 170.

The memory module 130 comprises a RAM (random access memory) module 132 and a ROM (read-only memory) module 134. The memory module 130 may be volatile or non-volatile. The memory module 130 may be implemented by integrated circuits and/or an optical or a magnetic disk drive. The device 100 can store user profiles, information such as pre-authentication for network access, vital statistics of the user, etc., in the memory module 130.

The user interface module 140 comprises a keypad module 142 that enables a user to navigate through an on-screen menu that is displayed on a display module 144 of the device 100. The keypad module 142 can be used to order lifestyle services from the lifestyle service providers 104. The display module 144 may comprise an LCD panel, a plasma display, etc., that displays menu selections, availability of the networks 102, information about lifestyle service providers 104, etc. The display may be in the form of text, graphics, icons, etc.

The user interface module 140 further comprises an audio module 146. The audio module 146 comprises a speaker and a microphone that enable the user to listen and talk, respectively. The user interface module 140 further comprises a sensing module 147 that can be used to sense ambient temperature, and vital statistics such as temperature, heart-rate, etc., of the user. Additionally, the user interface module 140 comprises a biometrics module 148 that can be used to sense and communicate biometric data of the user such as fingerprints, eye-scans, etc., for identity verification or authentication purposes.

The user interface module 140 enables a user to use the device 100 over the networks 102. For example, the user interface module 140 enables the user to interact with the lifestyle service providers 104, the non-wireless devices 116, the home WLAN 122, etc. As can be appreciated, additional interfaces can be incorporated in the user interface module 140.

The wireless module 150 comprises a medium access controller (MAC) module 152, a base band process (BBP) module 154, a radio frequency (RF) transceiver module 156, and an RF antenna 158. The wireless module 150 enables the device 100 to communicate with the networks 102. The wireless module 150 may conform to one or more IEEE standards such as 802.11, 802.11(a), 802.11(b), 802.11(g), 802.11(h), 802.11(n), 802.16, and 802.20 standards, which are incorporated herein by reference in their entirety.

The host interface module 160 comprises interface modules such as an Ethernet module 162, an infrared module 164, a USB module 166, a RS-232 module 168, etc. These interface modules enable the device 100 to communicate with non-wireless devices 116 that use interfaces other than a wireless interface. For example, the device 100 can communicate with a laser printer that has a USB port using the USB module 166. As can be appreciated, additional interfaces may be incorporated in the host interface module 160.

A control module 170 controls the operation of the device 100. Specifically, the control module 170 controls handshaking (exchange of commands and data) among the memory module 130, the user interface module 140, the wireless module 150, and the host interface module 160. The control module 170 comprises a computer program (software and/or firmware) that enables the device 100 to communicate with lifestyle service providers 104, home WLAN 124, etc.

The device 100 can detect the presence of one or more networks 102 when a user enters a wireless "hot spot." Specifically, the device 100 can seamlessly and securely select, join, and leave one or more networks 102. The device 100 enables the user to access one or more networks 102 and one or more lifestyle service providers 104. The user can access the networks 102 and the lifestyle service providers 104 on-demand or by pre-configuring the device 100 to access selected networks 102 and selected lifestyle service providers 104.

When the device is pre-configured to access selected networks 102 and selected lifestyle service providers 104, a personal identity or authentication information authorizing the user to access the selected networks 102 and the selected lifestyle service providers 104 is stored in the memory module 130. The device 100 automatically exchanges the authentication information with remote hosts/servers of the selected networks 102 and the selected lifestyle service providers 104 when the device 100 detects the networks 102 and the lifestyle service providers 104.

Specifically, when the user enters a hot-spot, the device 100 detects presence of available networks 102 and lifestyle service providers 104, and indicates their presence by displaying respective icons on the display module 144. If the user has preconfigured the device 100 to use a detected network 102 and a detected lifestyle service provider 104, the device 100 automatically logs in to the network 102 and into a host'server of the lifestyle service provider 104 using the stored authentication information. A lifestyle service preferred by the user at the point of sale of the lifestyle service provider 104 automatically appears on the display module 144.

For example, when the user enters a fast-food restaurant 110, a favorite meal of the user based on past orders placed by the user in that restaurant appears on the display module 144. The user may simply select "yes" from the menu on the display module 144 using the keypad module 142. When the user selects "yes," the device 100 transmits an order for the lifestyle service, and the order is ready for pickup at the point of sale. The user can pre-configure in the device 100 one or more lifestyle services provided by one or more lifestyle service providers 104. For example, the user can pre-configure favorite beverage at a coffee store, a favorite category of books at a book store, a favorite type of apparel, and so on.

Furthermore, depending on an ambient temperature and a body temperature of the user sensed by the sensing module 147, the device 100 can display on the display module 144 a hot or a cold food/beverage preferred by the user. Similarly, the device 100 can display on the display module 144 a preferred apparel that may be suitable for the ambient temperature when the user enters a hot spot of an apparel store 106.

The device 100 can track, store, and cache user behavior such as buying patterns. The behavioral data are stored in the form of user profiles in the memory module 130. The lifestyle service providers 104 can use the user profiles to selectively provide the user with context-sensitive and content-specific information when the user enters the hot-spot of the lifestyle service providers 104.

For example, when the user enters a hot-spot of an apparel store 106, the store 106 can flash on the display module 144 advertisements for a garment preferred by the user at that store 106. The advertisements may include streaming audio and/or video. The garment may be similar to an item that the user prefers at another store 106. This feature of the device 100 is transparent across geography. That is, the feature is independent of the location of the lifestyle service providers 104. Tracking the buying patterns of the user and flashing advertisements based on the buying patterns of the user can boost sales for the lifestyle service providers 104. Additionally, this can make shopping convenient and efficient for the user.

The device 100 can use the audio module 146 to convey to the user the information received from the network 102 and/or the lifestyle service providers 104 instead of or in addition to displaying the information using the module 144. For example, when the user enters a fast-food restaurant 110, a favorite meal of the user based on past orders placed by the user in that restaurant may be announced using the audio module 146 instead of or in addition to being displayed on the display module 144.

Additionally, the user can use the audio module 146 to input information in to the device 100 by using voice commands. For example, the user may simply say "yes" in response to a voice prompt for a lifestyle service received from a lifestyle service provider 104 instead of selecting "yes" from the menu on the display module 144 using the keypad module 142. When the user says "yes," the device 100 transmits an order for the lifestyle service, and the order is ready for pickup at the point of sale.

The device 100 comprises a search engine software. The search engine utilizes meta-keys based on profiles that are cached. The search engine can be used to locate a lifestyle service such as a meal or a beverage that closely matches a preferred choice of the user. The context used for search can be a type of network (e.g., one of the networks 102), a lifestyle service provider 104, and past preferences of the user for a lifestyle service (e.g., a type of a meal or a beverage) provided by a lifestyle service provider 104.

The context-sensitive search capability of the device 100 can be very useful when the user is traveling in a foreign country. For example, the user may desire a preferred lifestyle service that is available in the home area but unavailable in the foreign country. The search engine can be used to locate a lifestyle service provider in the area that provides a lifestyle service that closely matches the preferred choice of the user.

Additionally, the device 100 can be used to monitor/track events. Information about the events can be streamed on the display module 144. For example, the user can pre-configure the device 100 to monitor performance of stocks, internet-based auctions, sportspersons, sporting teams, etc., that are of interest to the user. The device 100 can display stock prices, auction prices, scores of sportspersons and/or sporting teams, etc., on the display module 144. The user can trade stocks and trade items at auctions using the keypad module 142 when the display module 144 shows a desired price.

The device 100 can be used to convert devices 116 that do not have wireless communication capability into devices that are capable of communicating with wireless networks 102. The device 100 communicates with the devices 116 using the interfaces in the host interface module 160, and the devices 116, in turn, communicate with the networks 102 using the wireless interface of the device 100. For example, the device 100 can use the USB module 166 to communicate with a camera 118 equipped with a USB interface, and the camera 118 can communicate with the networks 102 using the wireless communication module 150 of the device 100.

Similarly, using the Ethernet module 162, the device 100 can be plugged into an Ethernet port of a standalone PC 120 or a PC that is part of a wired LAN. The wireless communication module 150 of the device 100 enables the PC 120 to communicate with the networks 102. The authentication information stored in the memory module 130 automatically establishes the identity of the user on the PC 120 and enables the PC 120 to communicate with the networks 102. Thus, the device 100 can be used to transfer data between the devices 116 and the networks 102.

The identity-establishing feature of the device 100 can be useful in many other applications. For example, when the device 100 is plugged into a photo kiosk, the photo kiosk will automatically recognize the identity of the user based on the authentication information stored in the device 100 and will bring up the favorite photos of the user.

Additionally, the device 100 can be used as an active tag in a variety of RFID applications. For example, a user can simply walk through a security check-point. At that point, the device 100 will automatically transmit the biometric data of the user to a host/server of the security firm. The host/server can verify the biometric data and permit or decline access to the user. Similarly, the device 100 can be used to automatically make a credit card payment when the user exits a store after purchasing merchandise.

The user can also use the device 100 to chat with other users on the networks 102. The device 100 can automatically detect and display a "buddy list" or a list of users that are online on the networks 102. The user can select a person from the list using the keypad module 142 and chat with that person. Chat can be voice-based using the audio module 146. Alternately, the chat may be of instant messenger (IM) type.

Figure 3:
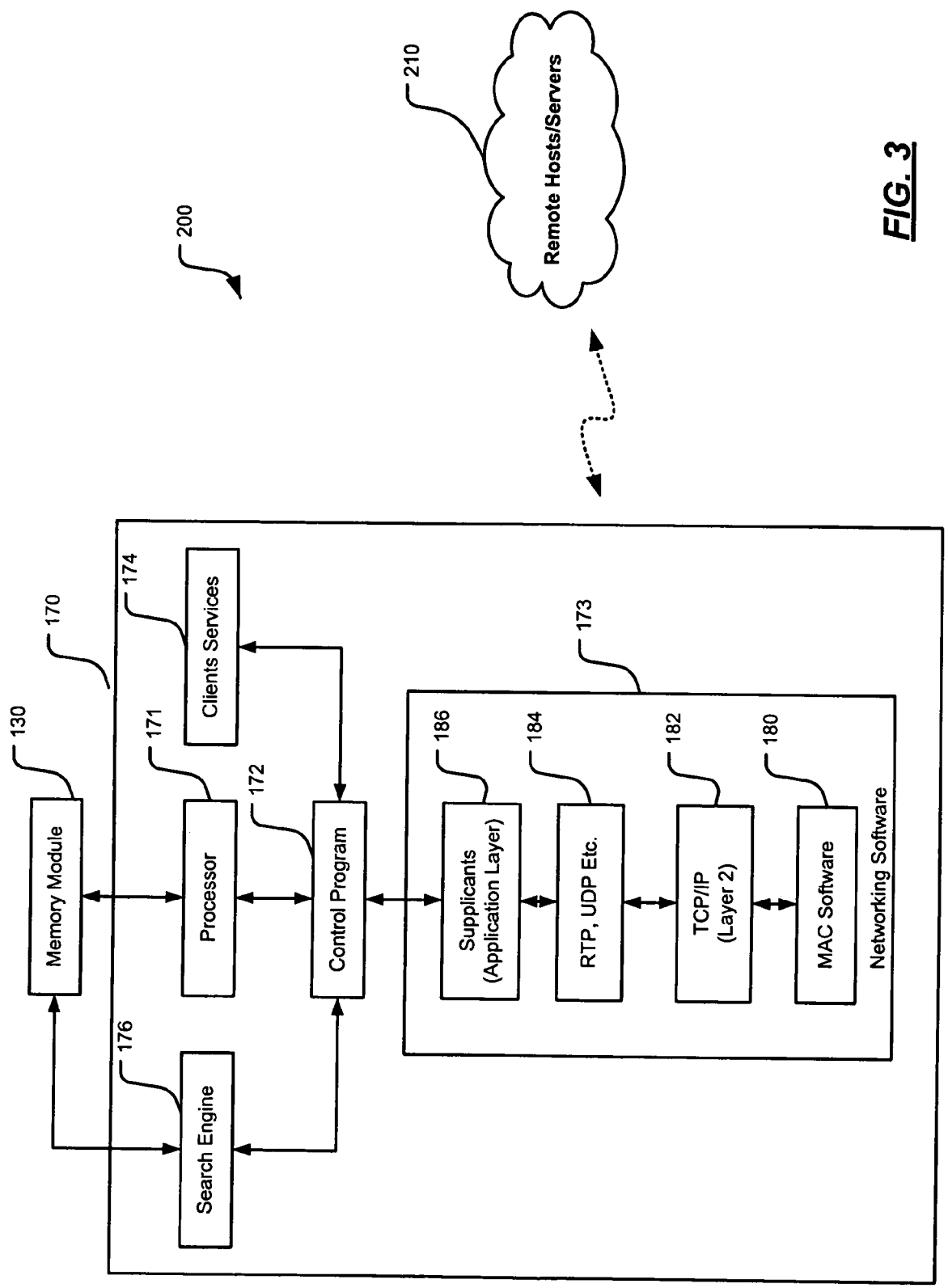
FIG. 3 shows a functional block diagram of an architecture for a personal lifestyle device according to the present invention.

Referring now to FIG. 3, an overview 200 of architecture of a computer program (software and/or firmware) utilized by the control module 170 is shown. The computer program may reside in the control module 170 and/or in the memory module 130. The control module 170 comprises a processor 171 that executes the computer program.

The computer program comprises a control program 172, a network program 173, a search engine 174, and one or more client services 178. The processor 171 executes the control program 172 to control the operation of the device 100. Specifically, the control program 172 manages handshaking, or exchange of commands and data, among the memory module 130, the user interface module 140, the wireless module 150, and the host interface module 160. The control program 172 processes information that is transmitted and received by the device 100.

The network program 173 enables the device 100 to communicate with the lifestyle service providers 104, the home WLAN 122, etc. The network program 173 comprises a medium access control (MAC) layer 180 that interfaces the hardware layer (the modules 130, 140, 150, 160, and 170) of the device 100 to a transport layer (layer 2). The transport layer of the network program 173 comprises TCP/IP 182, a user datagram protocol (UDP) and a real time protocol (RTP) 184, etc.

An application layer of the network program 173 comprises supplicants 186. The supplicants 186 request access to LAN services of remote hosts/servers 210 of the networks 102 and the lifestyle service providers 104. The supplicants 186 also respond to requests from remote hosts/servers 210 of the networks 102 and the lifestyle service providers 104.

The client services 174 are provided by providers of the networks 102 and the lifestyle service providers 104. The client services 174 enable the device 100 to communicate with remote hosts/servers 210 of the networks 102 and the lifestyle services providers 104.

The remote hosts/servers 210 comprise computer programs that receive data transmitted by the device 100 and transmit data to the device 100. Specifically, the computer programs that run on the remote hosts/servers 210 perform tasks such as verifying authentication information of the user of the device 100, process orders placed by the user, transmit advertisements to the user, etc.

The search engine 176 performs on demand, context-specific searches such as locating a lifestyle service in a foreign country. The search engine 176 uses user profiles or logs stored in the memory module 130 to perform the searches.

Figure 4:
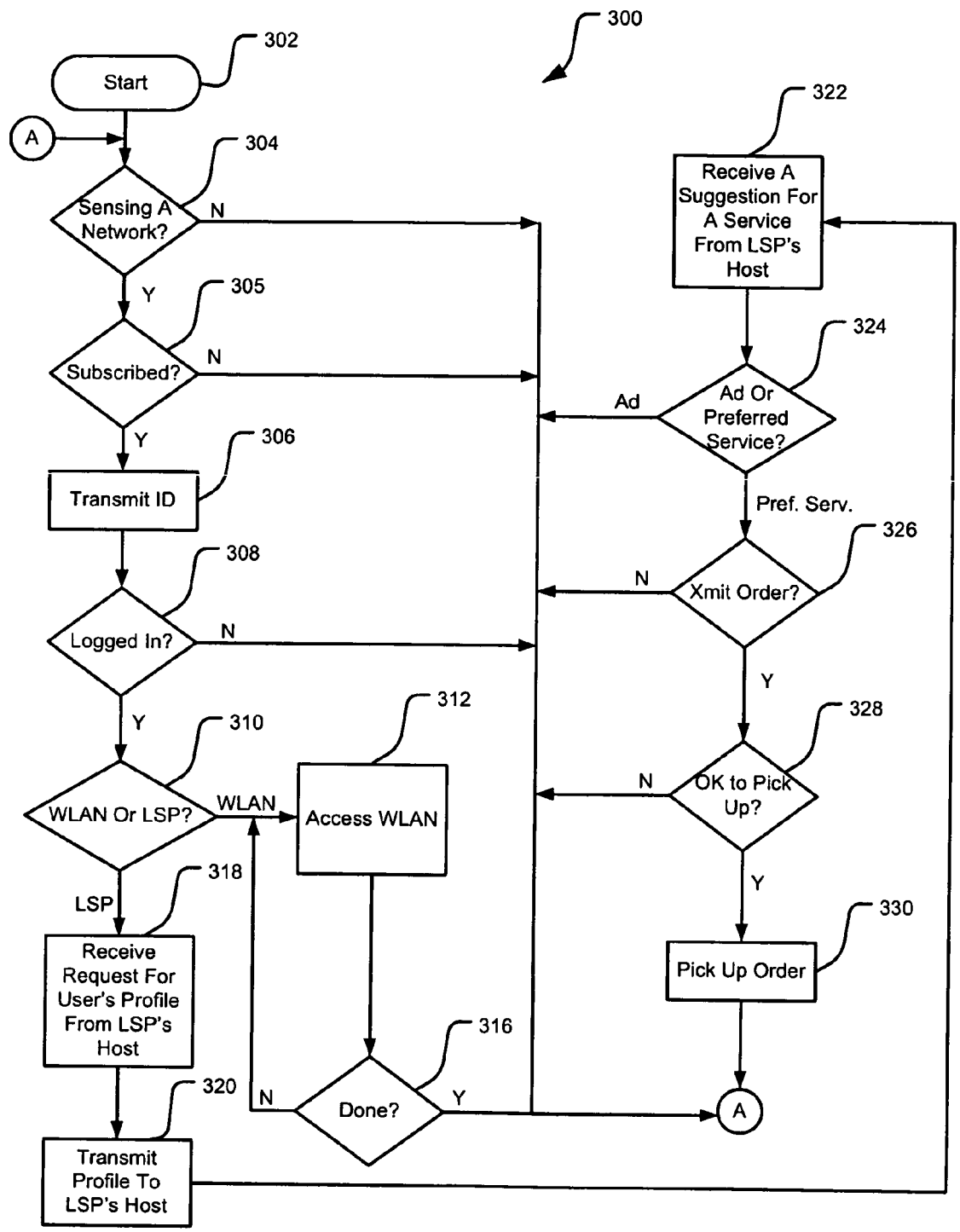
FIG. 4 is a flowchart of an exemplary method for operating a personal lifestyle device in an exemplary environment according to the present invention.

Referring now to FIG. 4, an exemplary method 300 for operating a personal lifestyle device 100 in an exemplary environment begins in step 302. The device 100 determines in step 304 if the device 100 is sensing a network. If not, the method 300 returns to step 302. Upon sensing a network, the device 100 determines in step 305 whether the user (owner of the device 100) has subscribed to the network. If not, the method 300 returns to step 302. Otherwise, the device 100 automatically transmits login information of the user to a remote host 210 of the network in step 306. The remote host 210 verifies the login information and transmits a message to the device 100 indicating whether the login succeeded. Based on the message, the device 100 determines in step 308 if the login succeeded. If the login failed, the method returns to step 302.

If the login succeeded, the device 100 determines in step 310 if the device 100 logged into a remote host 210 of a wireless local area network (WLAN) 102 or a remote host 210 of a lifestyle service provider 104. If logged into a WLAN 102, the user accesses the WLAN 102 in step 312 and can perform functions associated with distributed communications systems such as the Internet. For example, the user can perform activities such as sending instant messages, accessing e-mail, trading stocks, searching for a lifestyle service provider, and/or other activities. The user determines in step 316 whether to perform additional activities on the WLAN 102. If so, step 312 is repeated. Else, the method 300 returns to step 302.

Instead, if the user is 100 is logged into a remote host 210 of a lifestyle service provider 104, the device 100 automatically receives a request from the remote host 210 to transmit a user profile in step 318. The device 100 automatically responds to the request by transmitting a user profile in step 320. In step 322, the device 100 automatically receives a suggestion from the remote host 210 for a lifestyle service provided by the lifestyle service provider 104 in step 322.

The user determines in step 324 whether the suggestion is an advertisement or is a prompt to purchase a preferred service. The user may read and/or disregard the suggestion if the suggestion is an advertisement, and the method returns to step 302. If the suggestion is for a preferred service, the user may decide in step 326 whether to purchase the service.

If the user decides not to purchase the suggested service, the method returns to step 302. If the user orders the service, the device 100 transmits an order to the remote host 210 in step 326. The remote host processes the order by attempting to transfer appropriate funds from a preauthorized bank account of the user. The remote host 210 transmits a message to the device 100 indicating whether the order is successfully processed. Additionally, the remote host 210 places the order at a point-of-sale where the device 100 is located if the order is successfully processed. Based on the message received by the device 100, the user determines in step 328 whether the order may be ready for pickup. If not, the method returns to step 302. Otherwise, the user may pick up the order in step 330, and the method returns to step 302.

Figure 5A:
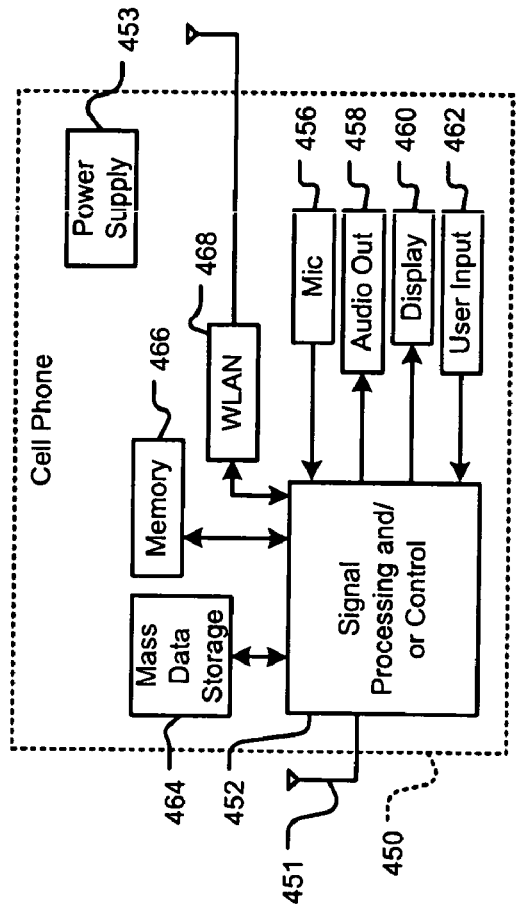
FIG. 5A is a functional block diagram of a cellular phone.
Figure 5B:
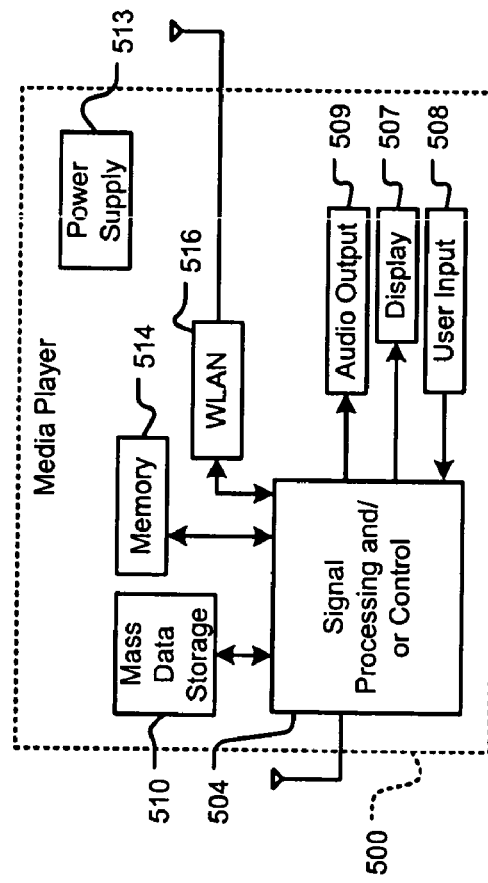
FIG. 5B is a functional block diagram of a media player.

Referring now to FIGS. 5A-5B, some exemplary implementations of the present invention are shown. Referring now to FIG. 5A, the present invention can be implemented in a cellular phone 450 that may include a cellular antenna 451. The present invention may be implemented in either or both signal processing and/or control circuits, which are generally identified in FIG. 5A at 452, a WLAN interface, mass data storage of the cellular phone 450 and/or a power supply 453. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Referring now to FIG. 5B, the present invention can be implemented in a media player 500. The present invention may be implemented in either or both signal processing and/or control circuits, which are generally identified in FIG. 5B at 504, a WLAN interface, mass data storage of the media player 500 and/or a power supply 503. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A personal lifestyle device (PLD), comprising:
 a communication module that communicates with a wireless network;
 a memory device that stores, in said PLD,
  authentication information that authorizes communication between said PLD and at least one of said wireless network and a lifestyle service provider, and
  a profile comprising a lifestyle service ordered from said lifestyle service provider using said PLD;
 a control module
  that communicates with said communication module and said memory device,
  that automatically establishes communication between said PLD and at least one of said wireless network and said lifestyle service provider using said authentication information, and
  that automatically receives a unicast for said lifestyle service from said lifestyle service provider, wherein said unicast is selectively based on said profile; and
 a sensing module that communicates with said control module and senses data comprising at least one of an ambient temperature, a body temperature of a user, and a heart-rate of said user,
 wherein said control module selectively transmits an order for said lifestyle service to said lifestyle service provider based on at least one of said ambient temperature, said body temperature of said user, and said heart-rate of said user.

2. The PLD of claim 1 wherein said communication module communicates with a plurality of wireless networks and a plurality of lifestyle service providers.

3. The PLD of claim 1 further comprising a display module that communicates with said control module and displays said unicast.

4. The PLD of claim 1 further comprising an audio module that includes a speaker and a microphone and that communicates with said control module, wherein said speaker generates audible sound waves based on data received by said PLD from at least one of said wireless network and said lifestyle service provider, and said microphone generates data transmitted by said PLD to at least one of said wireless network and said lifestyle service provider based on sound waves received by said microphone.

5. The PLD of claim 1 further comprising a keypad module that communicates with said control module and that is used to input information into said PLD.

6. The PLD of claim 1 further comprising a search engine that communicates with said control module and searches lifestyle services offered by a lifestyle service provider based on said profile.

7. The PLD of claim 1 wherein said communication module communicates peer-to-peer with a device via a wireless network.

8. The PLD of claim 1 further comprising a display module that communicates with said control module and automatically displays a list of other users that are online on said wireless network.

9. The PLD of claim 8 wherein said communication module communicates with said users using at least one of voice and instant messaging.

10. A method for managing personal lifestyle, comprising:
communicating with a wireless network;
storing, in said PLD, authentication information that authorizes communication with said wireless network and a lifestyle service provider;
storing in said PLD a profile comprising a lifestyle service ordered from said lifestyle service provider in said communication;
automatically communicating said authentication information with at least one of said wireless network and said lifestyle service provider;
automatically receiving a unicast for said lifestyle service from said lifestyle service provider, wherein said unicast is selectively based on said profile;
sensing data comprising at least one of an ambient temperature, a body temperature of a user, and a heart-rate of said user; and
selectively transmitting an order for said lifestyle service to said lifestyle service provider based on at least one of said ambient temperature, said body temperature of said user, and said heart-rate of said user.

11. The method of claim 10 further comprising communicating with a plurality of wireless networks and a plurality of lifestyle service providers.

12. The method of claim 10 further comprising displaying said unicast.

13. The method of claim 10 further comprising:
generating audible sound waves based on data received from at least one of said wireless network and said lifestyle service provider; and
generating data transmitted to at least one of said wireless network and said lifestyle service provider based on sound waves.

14. The method of claim 10 further comprising searching lifestyle services offered by a lifestyle service provider based on said profile.

15. The method of claim 10 further comprising communicating peer-to-peer with a device via a wireless network.

16. The method of claim 10 further comprising automatically displaying a list of users that are online on said wireless network and communicating with said users using at least one of voice and instant messaging.

17. A personal lifestyle device (PLD), comprising:
communication means for communicating with a wireless network;
memory means for storing, in said PLD,
authentication information that authorizes communication between said PLD and at least one of said wireless network and a lifestyle service provider, and
a profile comprising a lifestyle service ordered from said lifestyle service provider using said PLD;
control means
for communicating with said communication means and said memory means,
for automatically establishing communication between said PLD and at least one of said wireless network and said lifestyle service provider using said authentication information, and
for automatically receiving a unicast for said lifestyle service from said lifestyle service provider, wherein said unicast is selectively based on said profile; and
sensing means for communicating with said control means and sensing data comprising at least one of an ambient temperature, a body temperature of a user, and a heart-rate of said user,
wherein said control means selectively transmits an order for said lifestyle service to said lifestyle service provider based on at least one of said ambient temperature, said body temperature of said user, and said heart-rate of said user.

18. The PLD of claim 17 wherein said communication means communicates with a plurality of wireless networks and a plurality of lifestyle service providers.

19. The PLD of claim 17 further comprising display means for communicating with said control means and displaying said unicast.

20. The PLD of claim 17 further comprising audio means, including speaker means and microphone means, for communicating with said control means, wherein said speaker means generates audible sound waves based on data received by said PLD from at least one of said wireless network and said lifestyle service provider, and said microphone means generates data transmitted by said PLD to at least one of said wireless network and said lifestyle service provider based on sound waves received by said microphone.

21. The PLD of claim 17 further comprising keypad means for communicating with said control means and for inputting information into said PLD.

22. The PLD of claim 17 further comprising search engine means for communicating with said control means and for searching lifestyle services offered by a lifestyle service provider based on said profile.

23. The PLD of claim 17 wherein said communication means communicates peer-to-peer with another device via a wireless network.

24. The PLD of claim 23 wherein said communication means communicates with said users using at least one of voice and instant messaging.

25. The PLD of claim 17 further comprising display means for communicating with said control means and automatically displaying a list of users that are online on said wireless network.

* * * * *